United States Patent [19]
DeRoche

[11] Patent Number: 5,040,490
[45] Date of Patent: Aug. 20, 1991

[54] COLLAPSIBLE LIVESTOCK TRANSPORT STABLE

[75] Inventor: Mark DeRoche, Manhattan Beach, Calif.

[73] Assignee: Aerofex Corporation, Beverly Hills, Calif.

[21] Appl. No.: 400,525

[22] Filed: Aug. 30, 1989

[51] Int. Cl.$^5$ .............................................. B61D 3/00
[52] U.S. Cl. .......................................... 119/11; 119/27
[58] Field of Search ....................... 119/11, 15, 17, 19, 119/27

[56] References Cited

U.S. PATENT DOCUMENTS

| | | | |
|---|---|---|---|
| 4,256,056 | 3/1981 | Sou | 119/19 |
| 4,287,854 | 9/1981 | Hansen et al. | 119/17 |
| 4,397,398 | 8/1983 | Watanabe | 119/19 |
| 4,484,540 | 11/1984 | Yamamoto | 119/19 |
| 4,869,206 | 9/1989 | Spina | 119/17 |

Primary Examiner—Gene Mancene
Assistant Examiner—R. Thomas Price
Attorney, Agent, or Firm—Owen, Wickersham & Erickson

[57] ABSTRACT

A collapsible, reusable, livestock transport stable with interchangeable components that can be constructed without tools. The stable includes several types of component parts, with like parts each being interchangeable and useable in any position where such a part is needed. The first of those component parts is a platform which serves as the base of the stable. Next, there is a pair of side panels, each of which is rotatably attached to the side edges of the platform for providing the vertical sides of the stable. Interconnecting the two side panels is an aft panel. The aft panel is isntalled by resting its lower edge along the aft edge of the platform, its two vertical edges are captured by the side panels when the side panels are in the vertical attitude. The doors are attached to the forward edges of the side panels to provide closure of the stable.

35 Claims, 9 Drawing Sheets

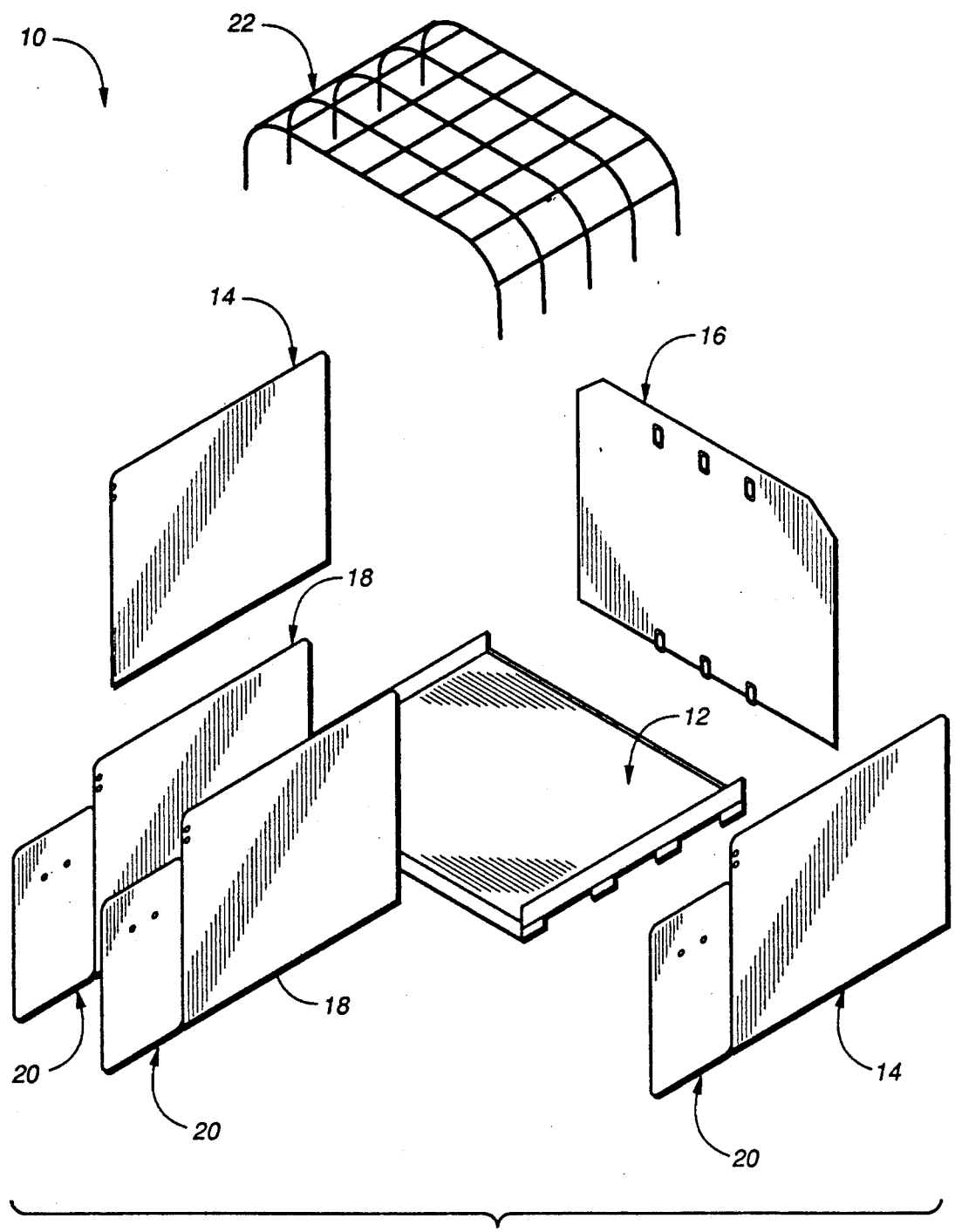
FIG._1

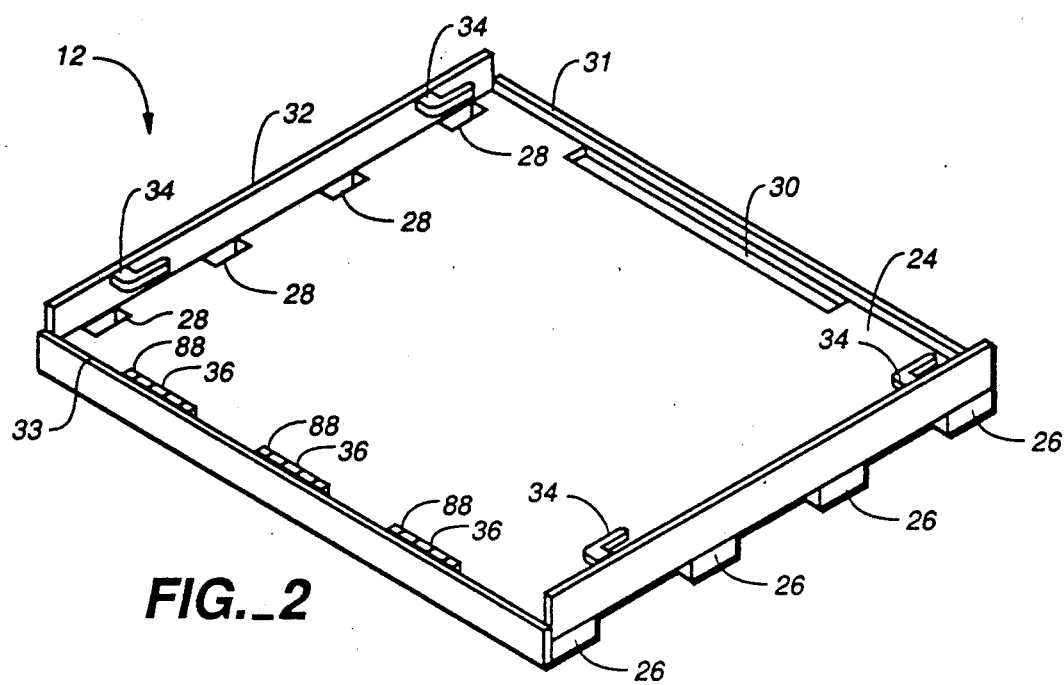
FIG._2
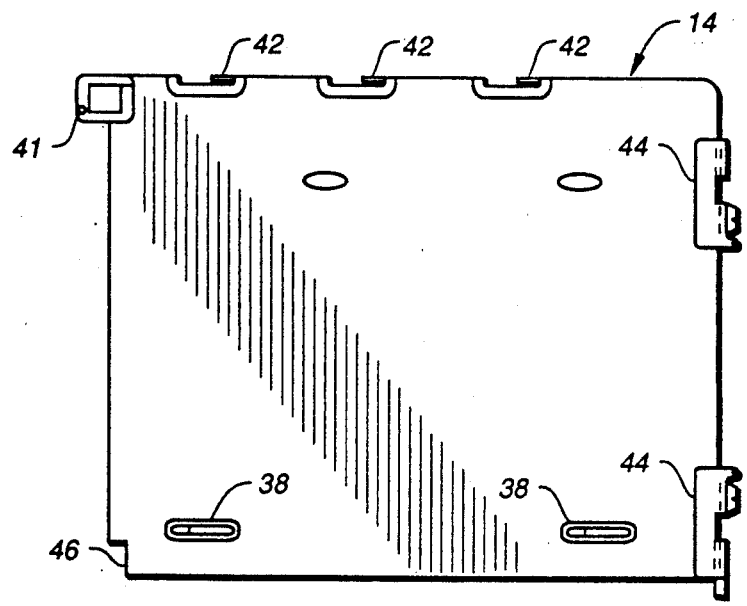
FIG._3

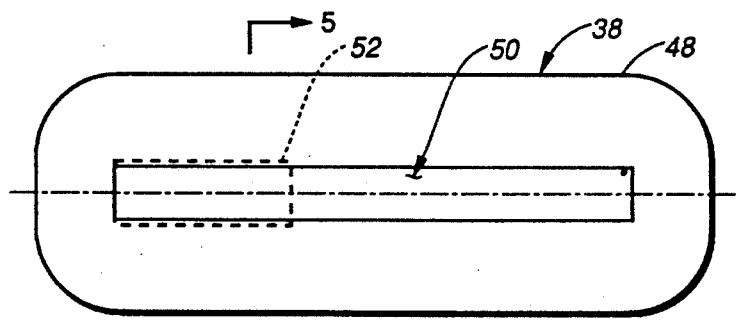
FIG._4
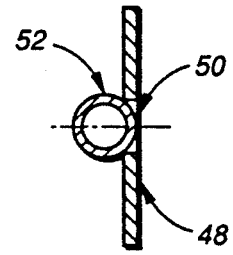
FIG._5
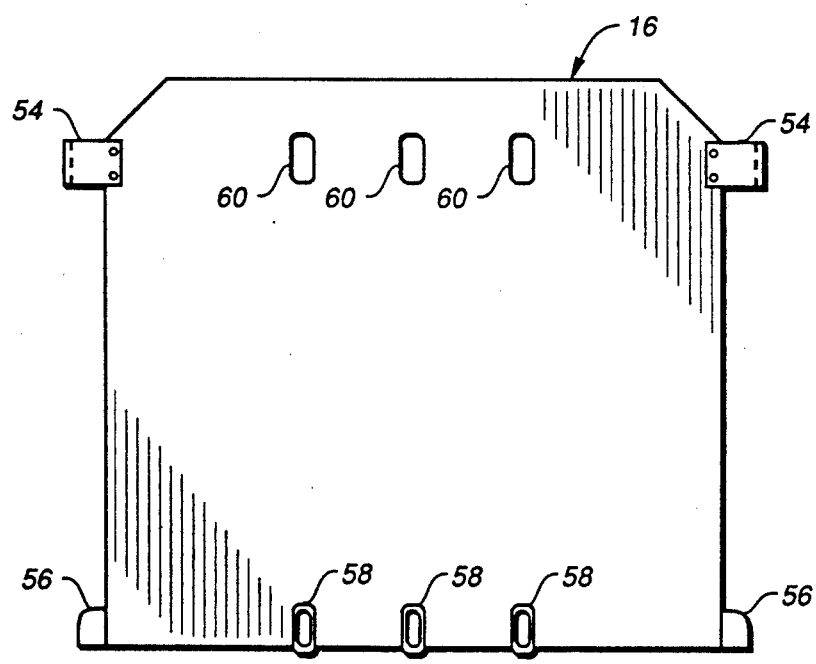
FIG._6
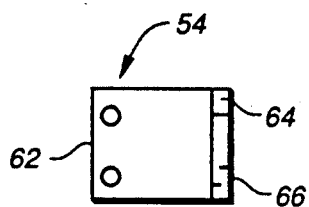
FIG._7A
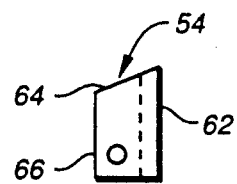
FIG._7B
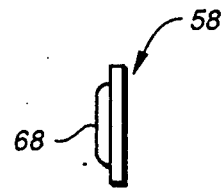
FIG._8

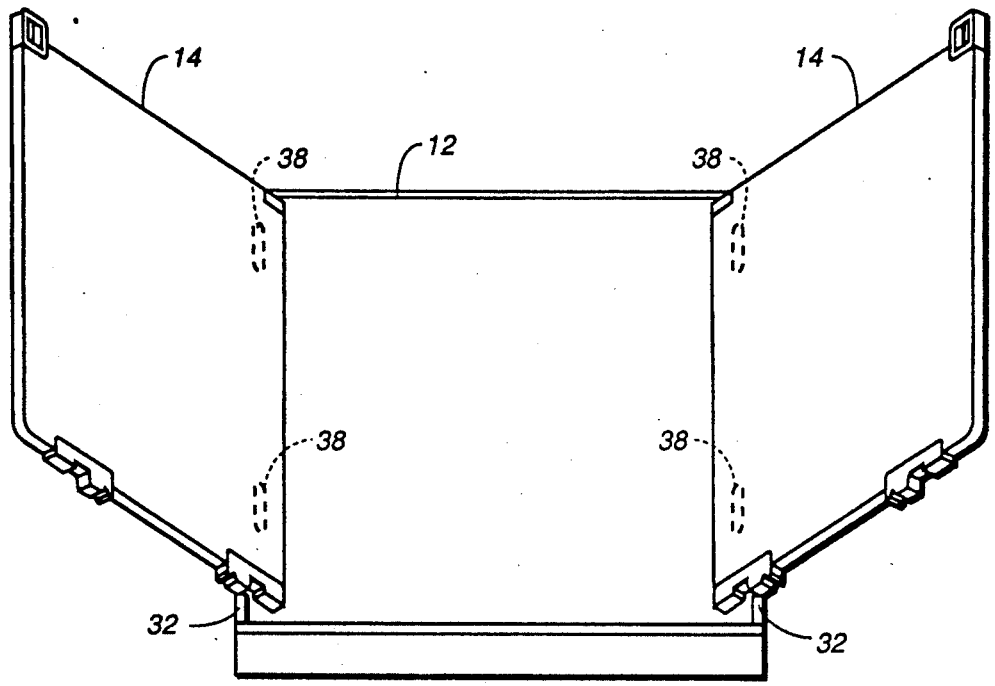
FIG._9
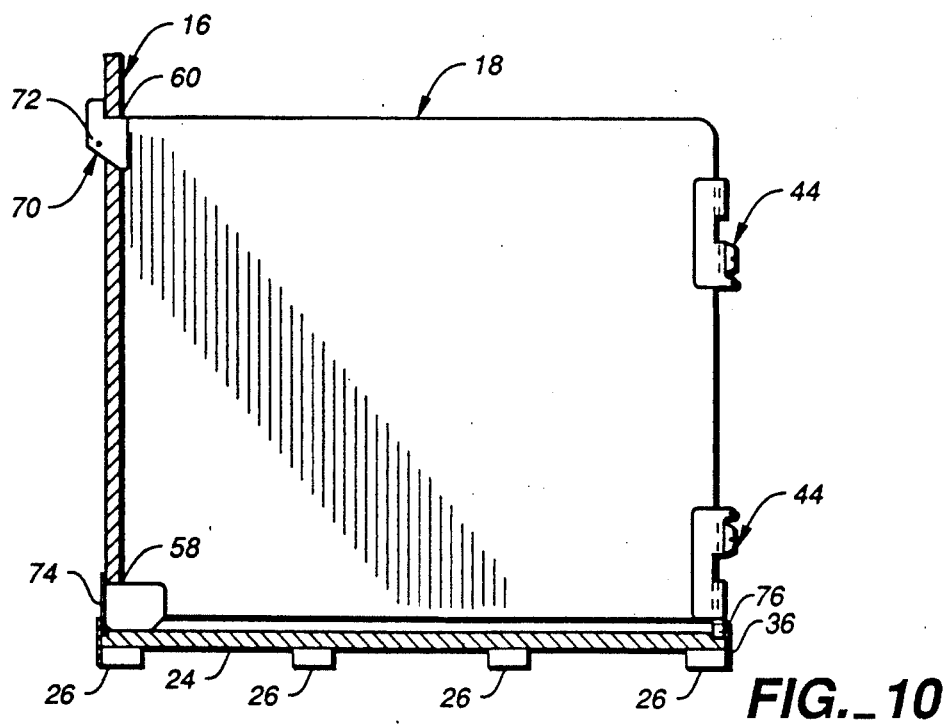
FIG._10

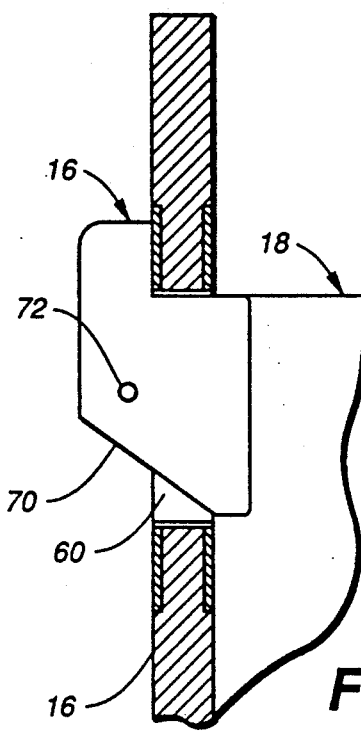
FIG._11
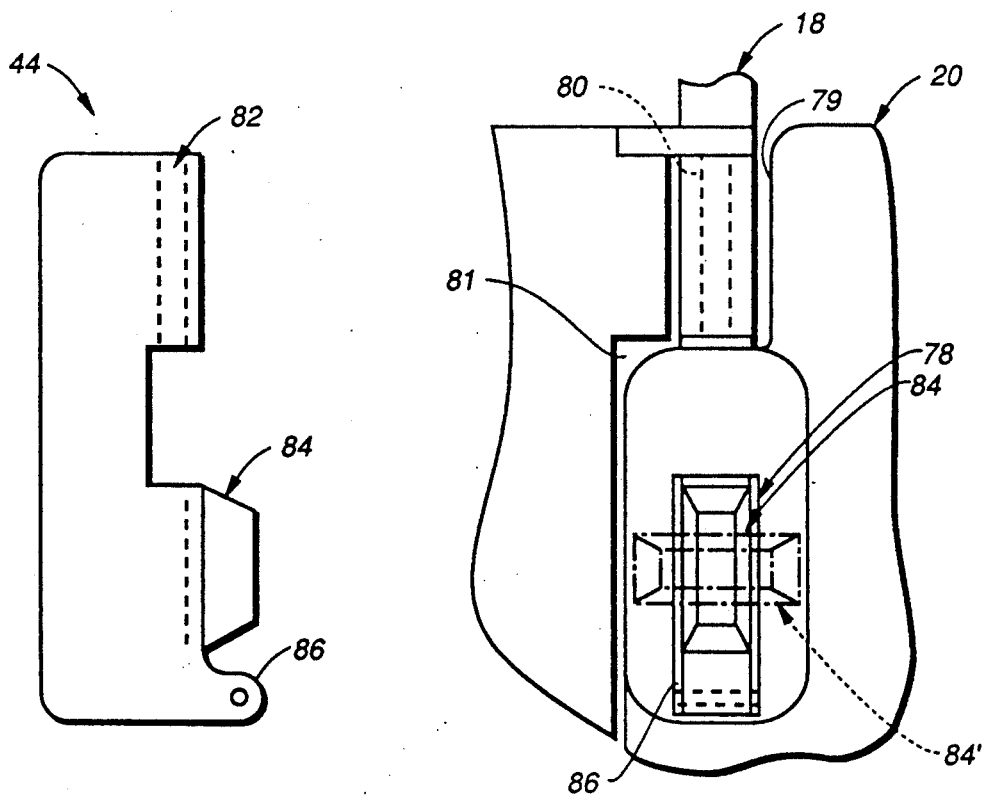
FIG._14  FIG._15

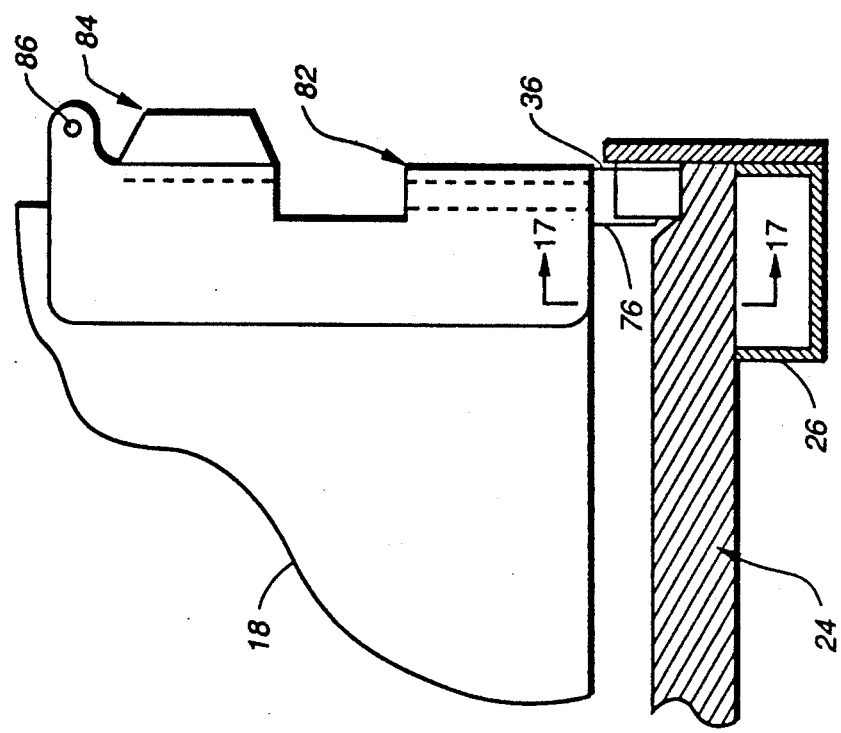
FIG._16
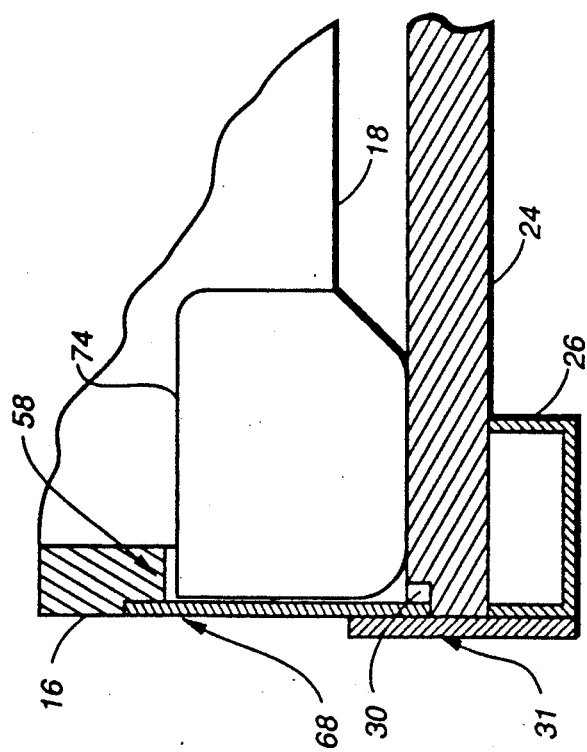
FIG._12

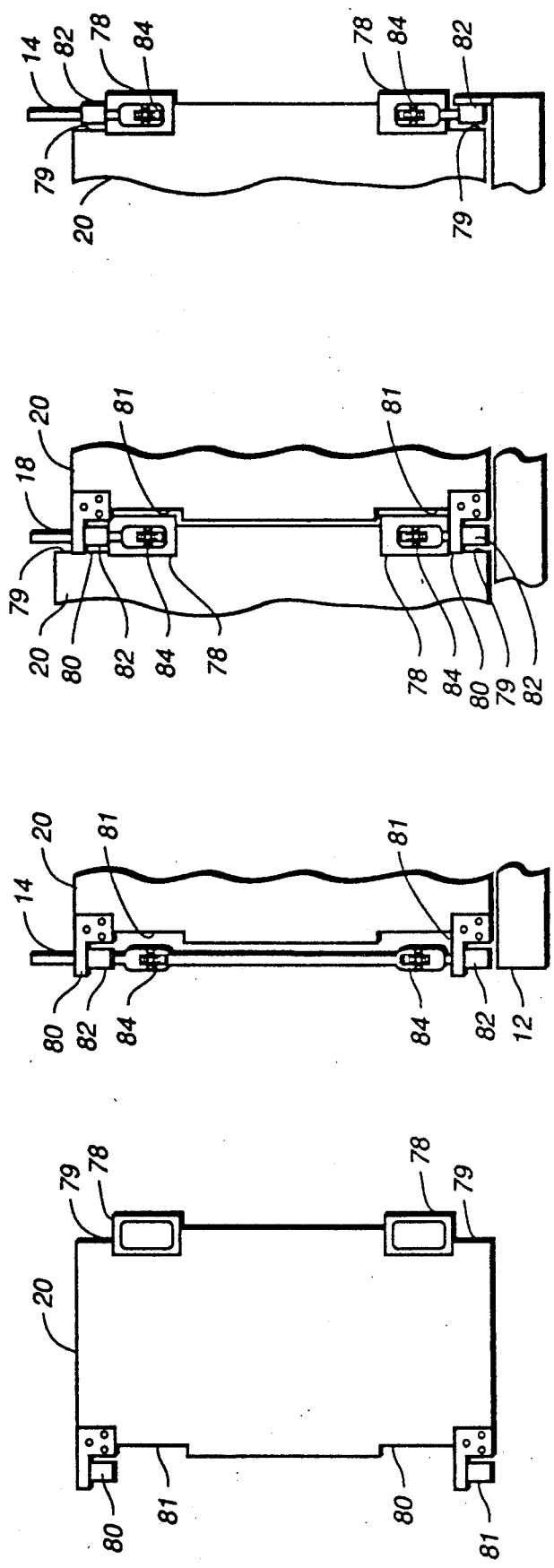

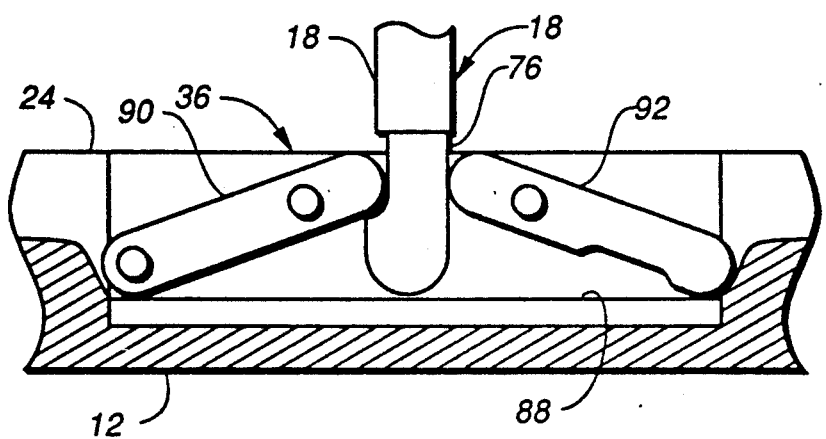
FIG._17A
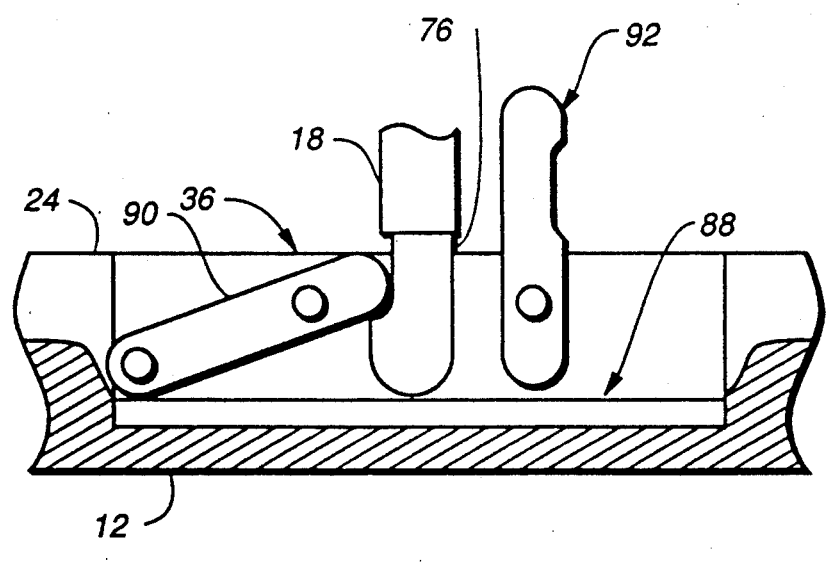
FIG._17B

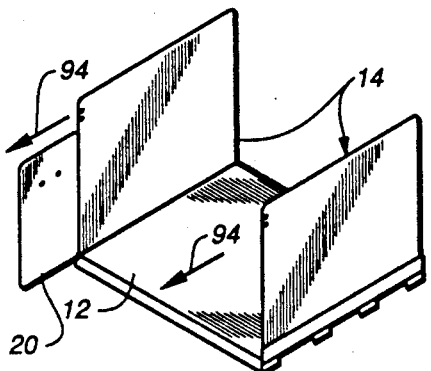
FIG._18A
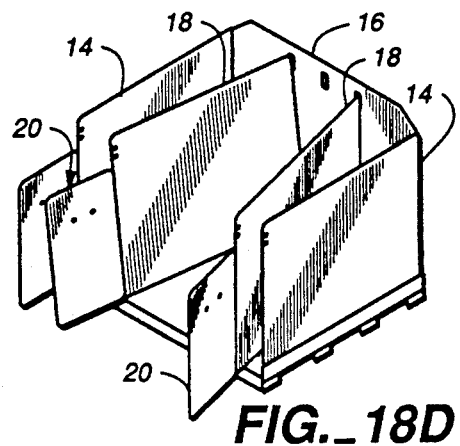
FIG._18D
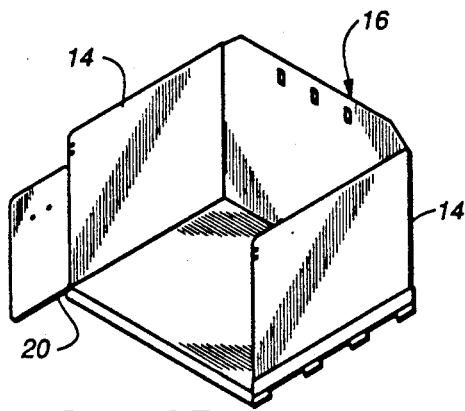
FIG._18B
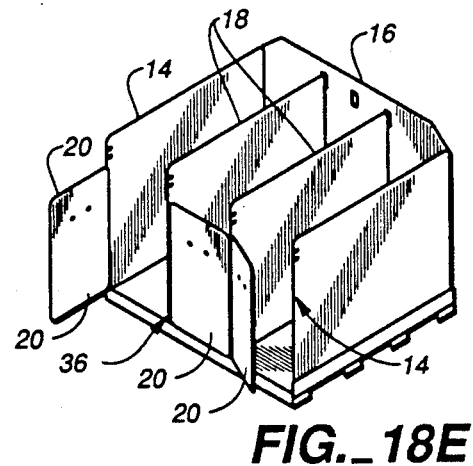
FIG._18E
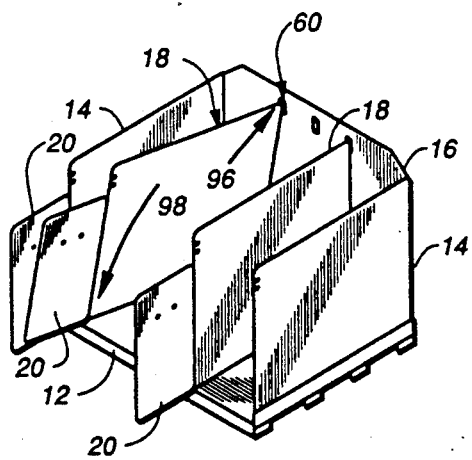
FIG._18C
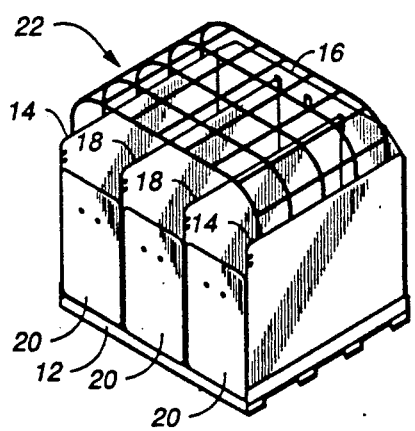
FIG._18F

COLLAPSIBLE LIVESTOCK TRANSPORT STABLE

BACKGROUND OF THE INVENTION

The present invention relates to stables for shipping livestock aboard aircraft, ships, and other forms of transport, namely, a reusable shipping stable that requires no tools for assembly/disassembly which can be assembled on board the vehicle or assembled and then loaded on board the vehicle (i.e. in the cargo bay of an aircraft, in the cargo hold of a ship, etc.).

In the past when one wished to ship livestock via any type of vehicle that is not specifically designed to transport that type of animal, a stable had to be assembled on the site either aboard the vehicle, or near the vehicle for loading onto the vehicle This generally required that plywood and nails had to be delivered to the loading area where a carpenter would build the stable as necessary.

Additionally, prefabricated stables are also used which are bulky and expensive to store and to deliver to the loading area. These types of stables also present a problem if the animal is to be shipped in only one direction and the stable returned. With the prefabricated stable, the cargo charges are the same in both directions since the stable occupies the same volume of space whether it is full or empty.

It would be desireable to have a livestock shipping stable that is collapsible, reusable, does not require tools to assemble or disassemble, and can be assembled or disassembled quickly by one or two people. The present invention provides such a livestock shipping stable.

SUMMARY OF THE INVENTION

In accordance with the illustrated preferred embodiment, the present invention provides a collapsible, reusable, livestock transport stable with interchangeable components that can be constructed without tools. That stable includes several types of component parts, with like parts each being interchangeable and useable in any position where such a part is needed. The first of those component parts is a platform which serves as the base of the stable. Next, there is a pair of side panels, each of which is rotatably attached to the side edges of the platform for providing the vertical sides of the stable. Interconnecting the two side panels is an aft panel. The aft panel is installed by resting its lower edge along the aft edge of the platform, its two vertical edges are captured by the side panels when the side panels are in the vertical attitude Then doors are attached to the forward edges of the side panels to provide closure of the stable.

DESCRIPTION OF THE FIGURES

FIG. 1 is an exploded perspective view of a collapsible livestock stable of the present invention.

FIG. 2 is a perspective view of the platform portion of the livestock stable of FIG. 1.

FIG. 3 is a plan view of the side panel of the livestock stable of FIG. 1.

FIG. 4 is a plan view of the pintle receptacle in the side panel near the lower edge of that panel to mate with the pintles of the platform.

FIG. 5 is a cross-sectional view of the pintle receptacle taken along line 5—5 in FIG. 4.

FIG. 6 is a plan view of the inside surface of the aft panel of the livestock stable of FIG. 1.

FIGS. 7a and 7b are back and side plan views, respectively, of the aft/side panel locking hardware attached to the upper corners of the aft panel as shown in FIG. 6.

FIG. 8 is a side plan view of the toe receiving recess in the lower portion of the aft panel as shown in FIG. 6.

FIG. 9 is a partially assembled perspective view of the stable of the present invention of FIG. 1.

FIG. 10 is a partially assembled view of the present invention showing a plan view of a mid-panel, and, the platform and aft panel in cross-section.

FIG. 11 is a plan view of the detail of the attachment hardware for interfacing the upper corner of a mid-panel with the aft panel of the present invention as shown in FIG. 10.

FIG. 12 is a plan view of the detail of the attachment hardware for interfacing the lower corner of a mid-panel with the aft panel of the present invention as shown in FIG. 10.

FIG. 13a is a plan view of a typical door of the present invention as shown on FIG. 1.

FIGS. 13b through 13d are partial cut-away views that show the hinge and locking hardware affixed to the side and mid-panels interfacing with one or more doors.

FIG. 14 is a side plan view of the combined hinge/locking mechanism affixed to the side and mid panels for mounting/locking the doors.

FIG. 15 is a partial front plan view showing one door locked to a mid-panel and another door hinged from the same mid-panel.

FIG. 16 is a side plan view of the lower front corner of a mid-panel and a partial cross-sectional view of the platform showing details of the door locking/hinge hardware of the present invention.

FIGS. 17a and 17b are partial cut-away views of a portion of the platform to show the details of the mid-panel locking mechanism in the locked and unlocked positions, respectively.

FIGS. 18a through 18f show the livestock stable of the present invention in progressive stages of assembly.

DESCRIPTION OF THE PREFERRED EMBODIMENTS OF THE PRESENT INVENTION

The present invention consists of lightweight shipping stable configured to provide a flexible and protective method for ferrying horses and other livestock by air and on other types of transports. The stable is designed to maximize the capacity of cargo aircraft from the wide-bodies (such as 747s and DC-10s), to narrow body transports (such as 727s and DC-8s). The stable of the present invention also lends itself to use in the cargo holds of ships, and in commercial truck vans and trailers. Each stable can be erected in the transport, or on the tarmac or dock, by a two-man crew without the use of tools. At the final destination, the stable can be easily collapsed to 1/10 of its erect size and can be stacked for shipment or storage.

FIG. 1 shows an exploded perspective view of the major components of a triple collapsible livestock transport stable 10 of the present invention. Those components are a platform 12 which forms the base of the stable with a pair of side panels 14 extending upward forming the sides. An aft panel 16 extends between the two side panels 14 upward from the back edge of platform 12 to form the back of the stable. Intermediate the two side panels 14, there may be none, one or more (two are shown here) mid-panels 18 to divide the interior of the stable into two or more stalls. In very small stables there may be only one stall and therefore no mid-panel. Also, hindgedly attached to the front edges of either of the side panels 14, or mid-panels 18, there is a door 20 to close the front of each of the stalls of the completed stable. Finally, there is an optional canopy 22 that can be used above the stable in a situation where there is a high ceiling and a chance that the horses or livestock may be thrown or jump from their stall. The ends of canopy 22 connect to fittings along the top edges of side panels 14 and extend upward and over the entire stable 10. Canopy 22 is constructed from stiffened webbing (e.g. epoxy impregnated cordura) with loops at the ends of the webs that extend across the full width of the assembled stable. The individual webs are stiffened to support the canopy in an arch above the stable since horses, and other livestock, do not like something in contact with their head and backs.

FIG. 2 shows the details of platform 12. The main support element for the horses, or livestock, is floor 24 which is supported in a raised position above the floor of the cargo bay of the aircraft by four reservoir channels 26. Each of the reservoir channels 26 is a "U" shaped channel having its ends closed by water tight removable end plates. The open side of each of channels 26 faces the underside of floor 24 with drains 28 from the surface of floor 24 into each end of channels 26 to collect the liquid and solid waste from the livestock housed in the stable during shipment. Drains 28 are located along the sides of floor 24 and are made small enough so that the hoofs of small animals can not get caught in them. Along the front and rear edges of platform 10 there is a small lip 33 and 31, respectively, that extends an inch or so above the surface of floor 24 for waste containment. Along each side of platform 12 there are side rails 32 that extend above the floor 24 by approximately 6 inches. Side rails 32 serve several purposes, one is waste containment, another is to provide attachment means for side panels 14, and then provide protection to the panels from fork-lift tines when the collapsed stable is stacked for shipment or storage. Affixed along the upper edge of each of the side rails 32, near the front and rear corners of platform 12, are inboard and rear pointing pintles 34. Floor 24 also defines a trough 30 along its rear edge in the central area for receiving the lower portions of mid-panel toe receptors 58 along the lower edge of aft panel 16. Similarly, along the front edge of floor 24 there are defined additional recesses, each of which contains a locking mechanism 36 for locking each mid-panel 18 into place.

Referring next to FIG. 3, there is shown the details of a side panel 14. Along the front edge of the side panel 14 is upper and lower door hinge/locking hardware 44 which are identical. Along the top edge of panel 14 there are three canopy pintles 42 onto which the loop ends of the stable crossing webs of canopy 22 are frictionally affixed. In the upper rear corner of panel 14 is affixed hardware 40 for locking a side panel 14 to the aft panel 16, with a tie-down hole 41 defined in hardware 40. In the lower rear corner of side panel 14 is a notch 46 which is necessary in the sliding engagement of the side panel 14 with platform 12 as discussed below. Finally, near, and approximately 5 inches up from, the lower edge of side panel 14, and adjacent the front and rear corners of side panel 14 are a pair of pintle receptacles 38. Note, so that there is no necessity to have a different right and left side panel 14, there are pintle receptacles 38 facing outward on both sides of side panel 14 (i.e. back to back with each other on the side toward, and the side away, from us on the panel shown in FIG. 3). FIGS. 4 and 5 show the details of pintle receptacles 38. Each includes an outer plate 48 for attachment to side panel 14, with a pintle clearance channel 50, and a pintle receiving tube 52. Pintle receiving tube 52 is thus interior to side panel 14 with plate 48 flush with the outside surface of side panel 14. Receptacles 38 are attached to side panels 14 so that tubes 50 are closest to the back edge of side panel 14.

To mount side panels 14 to platform 12 (see FIG. 18a), the side panel 14 is place onto platform 12 with rear notch 46 in contact with rear lip 31 so that pintles 34 extend into channels 50. Side panel 14 is then slid forward in the direction of arrow 94 to capture pintles 34 in pintle receiving tubes 52. With the location of pintles 34 and pintle receptacles 38 approximately 5 inches above floor 24, panels 14 are free to swivel outward as shown in FIG. 9. This is useful, as is discussed below, for the insertion of aft panel 16 into position, and when numerous rows of stables are to be loaded onboard an aircraft and the animals loaded through one row of stables to another row of stables behind them in the cargo bay or hold. By letting the side panels 14 lay away from the upright, the animal can pass through one stable without touching the sides and possibly damaging them.

Next, referring to FIG. 6 where the details of aft panel 16 are shown. Near the top edge and in the central region of aft panel 16 there are three receptor holes 60, and directly below holes 60, along the lower edge of panel 16, there are corresponding toe receptors 58 with approximately their bottom inch extending below the bottom edge of aft panel 16 (see FIG. 12). Holes 60 and receptors 58 are provided to interface mid-panels 18 with aft panel 16 as described below. Additionally, panel 16 includes outwardly extending locking tabs 56 in its lower corners, and outwardly extending side panel locking hardware 54 in its upper corners. The details of locking hardware 54 are shown in FIGS. 7a and 7b. Hardware 54 is basically "L" shaped with a bracket body 62 that is affixed to, and extends outward beyond the side edge of, aft panel 16, and a bracket tang 64. Bracket tang 64 extends at 90° from body 62 in the direction of the rear side of aft panel 16 and is non-rectangular in shape with a tie-down hole 66 therethrough. Toe receptor 58 incorporates a cup 68 that extends into the surface of aft panel 16 as shown in FIG. 8.

To mount aft panel 16 to platform 12, side panels 14 are let lay outward as shown in FIG. 9 and aft panel 16 is placed onto floor 24 of platform 12 adjacent rear lip 31 with the bottom portions of mid-panel toe receptors 58 in trough 30. Side panels 14 are then individually swiveled upward capturing locking tab 56 in lower rear notch 46 in side panel 14. As side panel 14 is swiveled toward aft panel 16, locking hardware 40 is brought adjacent locking hardware 54. Aft panel 16 is then moved forward or back as necessary to align tang 64 with the central hole of hardware 40 so that tang 64 passes through hole 40. Aft panel 16 is then swiveled backward to bring tie-down holes 41 and 66 into alignment (see FIG. 18b).

The next step in the construction of stable 10 is the addition of mid-panels 18, if required. In FIG. 6 three positions for mid-panels 18 are defined by receptor holes 60 and toe receptors 58. If a mid-panel 18 is located for positioning in each of the outer positions, then three stalls are created. If one mid-panel is positioned in the center of aft panel 16, then two large stalls are created. And if one mid-panel 18 is located in either of the outer positions, then one extra large stall and one regular sized stall are created. This flexibility is offered to accommodate large or very large animals or a group of small animals where a regular sized stall is either to small or too large.

FIG. 10 shows a mid-panel 18 in place above floor 24 and connected to aft panel 16. Mid-panel 18 includes, along its front edge, upper and lower door hinge/locking hardware 44. At the bottom front corner of mid-panel 18 there is a front toe bracket 76 that is captured by locking mechanism 36 in platform 12 as discussed below (see FIG. 16). On the bottom back corner of mid-panel 18 there is a rear foot 74 which extends into toe receptor 58 in aft panel 16 (see FIG. 12). At the top rear corner of mid-panel 18 there is an "L" shaped bracket 70 that extends through hole 60 in aft panel 16 and extends upward on the back of aft panel 16 with a tie-down hole 72 defined therethrough (see FIG. 11). Mid-panels 18 are installed into position by first lifting its front edge while inserting the tang of "L" bracket 70 into and extending it through hole 60 as shown by arrow 96 in FIG. 18c. The front edge of mid-panel 18 is then lowered, as shown by arrow 98, to bring toe 74 into toe receptor 58. At the same time, front toe bracket 76 is inserted into locking mechanism 36 and locked in place as described below. Note, the lower edge of mid-panel 18 is supported above floor 24 so that waste from the interior stall(s) can migrate to drains 28 adjacent side panels 14.

The details of locking mechanism 36 are shown in FIGS. 17a and 17b with the toe bracket 76 of the mid-panel 18 shown in the locked position in FIG. 17a, and in the unlocked position in FIG. 17b. Locking mechanism 36 is located in a trough 88 in floor 24 and adjacent the front lip 33 of platform 12. Included are two components, a fixed position locking bar 90 and a moveable locking bar 92. The fixed locking bar 90 extends diagonally upward from the bottom to the center of trough 88 with its upper end just below the surface of floor 24. The moveable locking bar 92 is swivelly mounted near the top and center of trough 88. When the free end of bar 92 is extended from trough 88 perpendicularly to floor 24, toe bracket 76 can pass between bars 90 and 92, and when the free end of bar 92 is depressed into trough 88 it rests on the bottom of trough 88 with the other end coming into contact with toe bracket 76 and pushes the other side of bracket 76 up against the upper end of bar 90. In the locked position, the space between the upper ends of bars 90 and 92 are substantially the same as the width of bracket 76.

To enclose each of the stalls of stable 10, doors 20 are provided. Each door is designed so that it can be either left or right hinged. Since the mid-panels 18 can be installed to create three different stall widths, there are three different door widths available. Door 20 is substantially rectangular with hinge pintle brackets 80 affixed to the top and bottom corners of one vertical edge adjacent lock notches 81 in the same vertical edge. On the other vertical edge, slightly inward from the corners which define hinge notches 79, are door lock hasps 78.

FIGS. 14-16 show the details of door hinge/locking hardware 44 which, as discussed above, is mounted on the top and bottom of the forward edges of the side panels 14 and the mid-panels 18. Hardware 44 includes a pintle receptor 82, a swivelly mounted turn lock 84, and a tie-down hole 86. In FIG. 15 the hardware is located at the top of a mid-panel 18, and in FIG. 16 it is locked at the bottom of a mid-panel 18. For simplicity of construction, pintle receptor 82 extends completely through the bracket. This allows the same hardware 44 to be used at both the top and bottom of the side or mid-panels 14 and 18 by merely inverting hardware 44 from one location to the other. FIG. 15 also shows the interfacing of two doors 20 at the upper edge of a mid-panel 18. The door 20 on the left has its hinge pintle 82 inserted into pintle receptor 82 of hardware 44, and the door 20 on the right has its hasp 78 captured by turn lock 84 of hardware 44. The turn lock is shown in the unlocked position as 84 and in the locked position as 84'. Also extending outward through hasp 78 is the tie-down 86 portion of hardware 44.

FIGS. 13b-13d show each of the possible combinations of doors 20 mounted on, or locking to, a side or mid-panel. FIG. 13b shows a door 20 hinged to a side panel 14 with notches 81 providing clearance for turn lock 84. Note that both of the hinge pintles 80 extend into the upper and lower pintle receptors 82 from above in all views. In FIG. 13c there are two doors 20 interfacing with a mid-panel 18 as in FIG. 15. In this view both top and bottom interfaces are shown and notches 81 also provide clearance for hasp 78 of the adjacent door 20. Finally, in FIG. 13d a door 20 is shown locking with a side panel 14 with notches 79 providing clearance for pintle receptors 82 mounted on the edge of side panel 14.

To protect the transport cargo area from the destructive elements associated with the shipment of animals, the stable of the present invention includes a raised platform 12 to create a virtual floor inside the cargo area. This floor 24 protects any pallet rails, roller floors and locks that may be present in the floor of the cargo hold during loading and transport of the animals. Platform 12 is capable of holding a minimum of 12 gallons/animal of liquid waste when the stable is level, and, with the inclusion of the four reservoir channels 26, containment of waste is extended to all shipping attitudes.

While the stable discussed above has only been the three stall size, the size of the stable can be easily changed to include any number of stalls that is desired. For aircraft shipment of livestock it is believed that the three and four stall sizes are the most practical. By having two or more different sizes for the livestock stables of the present invention, greater system capacity and flexibility is possible while holding the hardware to a manageable weight. Another feature of the present invention is that, except for the aft panel and the platform, stable components are interchangeable between stables of all sizes.

The stables of the present invention have been designed for the forward loading of animals in either a bulk or pallet configuration. Each triple and quad stable is self-standing as shown above, and secured to the cargo hold floor with standard cargo straps at least from the top of each of its four corners. Canopy 22 is provided for use in high ceiling cargo areas such as that in 747s and DC-10s.

The stables of the present invention have also been designed with animal and crew safety in mind through the use of bonded construction and flush fittings and fasteners providing smooth panels. Additionally, all panels are sealed, and the platform provided with a nonskid abrasion resistant surface. The open top and raised floor of the stables allows air circulation about each stable to improve ventilation without precipitating dust and bacteria, and quick crew access is facilitated enroute to allow attention to animals of varying temperament.

When pallet loading of the stables is desired, no special preparation of the cargo hold is necessary. However, due to the nature of the cargo being shipped, the loadmaster will position the pallet to assure maximum ventilation and accessibility.

In a bulk loading situation, additional concerns are presented for both animal and aircraft, or ship, safety. To aid in the protection of the cargo hold from abuse, as well as limiting the stress imposed on the animals and crew, several simple procedures have been developed. While these procedures do not affect the structural integrity of the stables of the present invention, they do lend themselves to the safe operation and loading of the stables.

To protect the floor of the cargo hold from waste, particularly as the livestock is loaded and unloaded, a continuous sheet of non-flammable plastic can be rolled out over the exposed floor areas. The platforms 12 of the present invention are next positioned about the cargo hold so that they straddle the hardware in the floor of the cargo hold to protect it from damage, allowing a minimum of 24 inches between adjacent rows of stables. Next, it is suggested that, hydroscopic fiberboard, or cellotex, be placed between each row of stables to further protect the floor of the cargo hold from the hooves and metal shoes of the animals during loading and unloading. The use of the fiberboard also effectively raises the floor of the cargo hold to the level of the floor 24 of the platforms 12, and serves to ease the loading process for the animals. Next, the stalls furthest into the cargo hold from the cargo door are constructed to the stage shown in FIG. 18d, namely to the point just before the toe brackets 76 of mid-panels 18 are locked into locking mechanisms 36, and all other stables are constructed no further than the stage shown in FIG. 9.

Because of the way that the mid-panels are attached to aft panel 16, they may be swivelled to either side before loading of all but the last animal to be loaded into that stable (see FIG. 18d). This option is provided to facilitate the loading of animals that are too skittish to enter the narrow stall. As each animal is loaded, toe bracket 76 is locked into the appropriate lock 36. Next the doors are installed and locked. At this time the stable is tied-down to the cargo floor of the transport by attaching tie-down straps to at least the top four corners of the stable using tie-down holes 41, 66, 72 and 86. The next row of stables closer to the cargo hold door are then assembled to the stage shown in FIG. 18d. The procedure is then repeated as necessary until all stables are assembled and loaded. As a final step, if desired, the canopy 22 may be placed over one or more of the stables 10 at the discretion of the loadmaster.

When the animals reach their destination, the process of unloading them and disassembly of the stables is just the opposite of the loading and assembly process. Since the stables have been designed to contain waste, it is essential that they be broken down in a designated cleaning area away from the transport. All hardware should be thoroughly cleaned immediately following use. Reservoir channels should be opened by removal of the seals and flushed with a hose from one end with the waste escaping through the other end. Steam cleaning or high pressure hosing is recommended to remove the waste. Disinfectants or abrasive cleaners can be used, if necessary, as they will not harm the hardware. Materials and construction of the stable components do not promote rust or rot and therefore can be stacked while wet. Long term exposure to harsh environments may effect the fit and function of the stables. Therefore it is recommended that all hardware be covered when stored in such conditions. As stated above, the components of the stable can be stacked with platform 12 serving as a pallet since all of the components are sized to fit within the lips of the platform. The only prohibition is if the aft panel 16 is loaded first tangs 64 of locking hardware 54 must be facing upward to fit within the lips of platform 12.

It will be apparent to one skilled in the art that the present invention is not limited to the above-mentioned configuration, and the scope to the invention should be limited only by the scope of the appended claims.

What is claimed is:

1. A collapsible, reusable, livestock transport stable comprising:
   platform means for providing a base of the stable;
   a pair of side panel means rotatably attached to the platform means for providing vertical sides to the stable;
   aft panel means resting on the platform means and captured by said pair of side panel means when the side panel means are in a vertical attitude for providing the vertical aft panel of the stable; and
   door means attached to each forward edge of said pair of side panel means for providing closure of the stable
   wherein each of said side panel means includes:
     a flat, substantially rectangular panel defining a notch in a lower aft corner thereof; and
     a receptacle defining a rectangular hole therethrough attached to an upper aft corner of said side panel means; and
   wherein said aft panel means includes:
     a flat, substantially rectangular panel defining outwardly extending tabs at each of a pair of lower side corners thereof for mating with said notches of said side panel means when said aft panel means is installed on said platform and said side panel means is vertical; and
     a pair of L-shaped brackets each attached to an upper side corner of, and extending outward from the side edge of, the panel of the aft panel means with a tang of the bracket extending rearward in a plane that is substantially perpendicular to a surface of the aft panel means, said tang being sized and shaped to pass through a rectangular hole through the receptacle attached to the panel of the side panel means and the tang to contact the outer surface of said receptacle when said aft panel means is installed on said platform means and the panel of said side panel means is vertical.

2. A collapsible, reusable, livestock transport stable as in claim 1 wherein said platform means includes waste containment means for collecting and containing solid and liquid waste from livestock contained in the stable.

3. A collapsible, reusable, livestock transport stable as in claim 1 wherein said platform means includes:
   floor means for forming the top surface of the platform means; and
   a plurality of spaced-apart support means beneath a floor means for supporting the platform means and for providing reservoirs for solid and liquid animal waste;

said floor means defining drain means therethrough in communication with said plurality of support means for draining animal waste from the floor means into the support means.

4. A collapsible, reusable, livestock transport stable as in claim 1 wherein:

said platform means includes:

a forward, an aft and a pair of side edges;

rail means on each side edge extending vertically upward from an interior surface of the platform means;

a pair of rear pointing pintle means along a top inboard edge and spaced away from the forward and aft edges of each rail means for attachment to one of said side panels; and each of said side panel means includes:

a flat, substantially rectangular panel; and a pair of pintle receptacle receiving means mounted into a side of the panel means spaced upward from a bottom edge and away from the forward and aft edges of the panel means so that they are adjacent the pintle means of the rail means when the side panel means is in its final position for rotationally retaining the pintle means so that each side panel means is rotatable around the top edge of the rail means.

5. A collapsible, reusable, livestock transport stable as in claim 4 wherein said receptacle receiving means includes:

an outer plate defining a rectangular, horizontally oriented slot therethrough;

a pintle receiving tube having interior dimensions and shape to receive the pintle means therewithin, said tube being attached to an inner surface of said outer plate and having a major axis of the tube aligned with a center-line of said slot and having a length that is less than one-half the length of said slot.

6. A collapsible, reusable, livestock transport stable as in claim 1 wherein each of said receptacles of each side panel means and the tang of each of the L brackets attached to the aft panel means defines a tie-down hole therethrough which align with each other when said side and aft panel means are in their assembled positions on the platform means.

7. A collapsible, reusable, livestock transport stable as in claim 1 wherein:

each of said side panel means includes door hinge/locking hardware means along a front edge thereof for hingedly supporting and locking said door means; and said door means includes a flat, substantially rectangular panel having hinge pintle means attached to the top and bottom corners of one vertical edge with lock clearance notches defined inward along that edge and adjacent said hinge pintle means, and the top and bottom corners of the other vertical edge defining hinge clearance notches with door locking hasps adjacent said hinge clearance notches, said hinge and lock clearance notches being provided to enable said door means to lock with or be hinged from the hinge/locking hardware means on the front edge of either side panel means.

8. A collapsible, reusable, livestock transport stable as in claim 7 wherein said door hinge/locking hardware means includes:

a body portion for attachment to the front edge of said side panel means, said body portion defining a hinge pintle receptor cavity for receiving the hinge pintle of the door means from either end of said cavity; and turn lock means spaced apart from said hinge pintle receptor cavity and attached to said body for mating with said door locking hasp of said door means.

9. A collapsible, reusable, livestock, transport stable as in claim 1 wherein:

said stable further comprises at least one mid-panel means attachable to said platform means and said aft panel means for dividing the interior of the stable into stalls; and said door means includes one door for each stall to provide closure of the stable with each door being hingedly attached to and locking with either the side panel means or mid-panel means.

10. A collapsible, reusable, livestock transport stable as in claim 9 wherein:

each of said side panel means includes door hinge/locking hardware means along the front edge thereof for hingedly supporting and locking said door means;

each of said at least one mid-panel means includes door hinge/locking hardware means along the front edge thereof for hingedly supporting and locking said door means; and said door means includes a flat, substantially rectangular panel having hinge pintle means attached to the top and bottom corners of one vertical edge with lock clearance notches defined inward along that edge and adjacent said hinge pintle means, and the top and bottom corners of the other vertical edge defining hinge clearance notches with door locking hasps adjacent said hinge clearance notches, said hinge and lock clearance notches being provided to enable said door means to lock with or be hinged from the hinge/locking hardware means on the front edge of either side panel means or mid-panel means.

11. A collapsible, reusable, livestock transport stable as in claim 10 wherein said door hinge/locking hardware means includes:

a body portion for attachment to the front edge of said side or mid-panel means, said body portion defining a hinge pintle receptor cavity for receiving the hinge pintle of the door means from either end of said cavity; and turn lock means spaced apart from said hinge pintle receptor cavity and attached to said body for mating with said door locking hasp of said door means.

12. A collapsible, reusable, livestock transport stable as in claim 9 wherein:

said aft panel means includes:

a flat, substantially rectangular panel defining at least one rectangular opening therethrough in close proximity to the upper edge of said panel, each of said at least one opening defining an upper attachment point for one of said at least one mid-panel means; and at least one mid-panel toe receptor means mounted and extending into the surface of the panel of the aft panel means in close proximity to the lower edge of said panel and in direct vertical alignment with a corresponding one of said at least one rectangular opening for defining a lower attachment point for one of said at least one mid-panel means;

said platform means includes floor means for forming the top surface of the platform means which defines a trough along the aft edge thereof and in position to correspond to the position of said at least one mid-panel toe receptor means on the aft panel means; and each of said at least one mid-panel means includes:

a substantially rectangular panel;

a rear foot attached to the aft lower corner of the panel of the mid-panel means so that a portion of said foot extends beyond the bottom and aft edges of said panel for mating with said trough in the floor and the toe receptor means to support the bottom edge of the panel of the mid-panel means above the floor of the platform means; and L bracket means attached to the upper aft corner of the panel of the mid-panel means so that a portion of said bracket extends beyond the aft and upper edges of the panel of the mid-panel means for being received in, extending through and above the top of, one of said at least one rectangular hole in the panel of the aft panel means to attach the two panels one to the other.

13. A collapsible, reusable, livestock transport stable as in claim 9 wherein:

each of said at least one mid-panel means includes:

a substantially rectangular panel;

a front toe bracket attached to the forward lower corner of the panel of the mid-panel means so that a portion of said toe bracket extends beyond the bottom edge, and in-line with the forward edge, of said panel of the mid-panel means to support and lock in place the bottom edge of the panel of the mid-panel means above the floor of the platform means; and said platform means includes:

floor means for forming the top surface of the platform means which defines a trough along the forward edge thereof and in position to correspond to the position of said at least one mid-panel means; and locking means in the trough along the forward edge of said platform means for capturing said front toe bracket of said at least one mid-panel means.

14. A collapsible, reusable, livestock transport stable as in claim 13 wherein said locking means includes:

a fixed position locking bar extending diagonally upward from the bottom to the center of said trough with its upper end just below the surface said floor; and a moveable locking bar swivelly mounted near the top and center of said trough so that when the free end of the moveable bar extends from said trough perpendicularly to said floor, said toe bracket on the panel of the mid-panel means can pass between the fixed and moveable bars, and when the free end of moveable bar is depressed into said trough the free end rests on the bottom of said trough with the other end coming into contact with said toe bracket to push the other side of said toe bracket up against the upper end of said fixed bar, in this the locked position the space between the upper ends of said fixed and moveable bars is substantially the same as the width of said toe bracket.

15. A collapsible, reusable, livestock transport stable as in claim 1 further comprising canopy means affixable to the upper edges of said side panel means for providing vertical movement restraint to animals housed in said stable.

16. A collapsible, reusable, livestock transport stable with interchangeable components that can be constructed without tools, pins or free hardware, said stable comprising:

platform means for providing a base of the stable;

a pair of side panel means attached to the platform means for providing vertical sides to the stable;

aft panel means resting on the platform means and captured by the side panel means when the side panel means are in the vertical attitude for providing the vertical aft panel of the stable; and door means attached to the forward edges of said side panel means for providing closure of the stable;

each of said side panel means includes door hinge/locking hardware means along a front edge thereof for hingedly supporting and locking said door means; and said door means includes a flat, substantially rectangular panel having hinge pintle means attached to top and bottom corners of one vertical edge of said door means with a set of lock clearance notches defined inward along that edge and adjacent said hinge pintle means, and top and bottom corners of the other vertical edge defining hinge clearance notches with a set of door locking hasps adjacent said hinge clearance notches, said hinge and said lock clearance notches being provided to enable said door means to lock with or be hinged from the hinge/locking hardware means on the front edge of either side panel means.

17. A collapsible, reusable, livestock transport stable as in claim 16 wherein said door hinge/locking hardware means includes:

a body portion for attachment to the front edge of each of said pair of side panel means, said body portion defining a hinge pintle receptor cavity for receiving the hinge pintle means of the door means from either end of said cavity; and turn lock means spaced apart from said hinge pintle receptor cavity and attached to said body portion for mating with one of said set of door locking hasps of said door means.

18. A collapsible, reusable, livestock transport stable with interchangeable components that can be constructed without tools, pins or free hardware, said stable comprising:

platform means for providing a base of the stable, and means for collecting and containing solid and liquid waste from livestock within the stable;

a pair of side panel means attached to the platform means for providing vertical sides to the stable;

aft panel means resting on the platform means and coupled to the side panel means for providing the vertical aft panel of the stable;

door means attached to a forward edge of said side panel means for providing closure of the stable;

at least one mid-panel means attachable to said platform means and said aft panel means for dividing an interior of the stable into stalls; and said door means includes a door for each stall to provide closure of the stable with each door being hingedly attached to and locking with either a first of said pair of side panel means or said mid-panel means.

19. A collapsible, reusable, livestock transport stable as in claim 18 wherein:

each one of said pair of side panel means includes door hinge/locking hardware means along a front edge thereof for hingedly supporting and locking said door means;

each of said at least one mid-panel means includes door hinge/locking hardware means along a front edge thereof for hingedly supporting and locking said door means;

each of said at least one mid-panel means included door hinge/locking hardware means along a front edge thereof for hingedly supporting and locking said door means; and said door means includes a flat, substantially rectangular panel having hinge pintle means attached to top and bottom corners of one vertical edge of said door means with lock clearance notches defined inward along that edge and adjacent said hinge pintle means, and top and bottom corners of the other vertical edge defining hinge clearance notches with a set of door locking hasps adjacent said hinge clearance notches, said hinge and lock clearance notched being provided to enable said door means to lock with or be hinged from the hinge/locking hardware means on the front edge of either one of said pair of side panel means or said mid-panel means.

20. A collapsible, reusable, livestock transport stable as in claim 19 wherein said door hinge/locking hardware means includes:

a body portion for attachment to the front edge of said one of said pair of said mid-panel means, said body portion defining a hinge pintle receptor cavity for receiving the hinge pintle means of the door means from either end of said cavity; and turn lock means spaced apart from said hinge pintle receptor cavity and attached to said body for mating with one of said set of door locking hasps of said door means.

21. A collapsible, reusable, livestock transport stable as in claim 18 wherein:

said aft panel means includes:
a flat, substantially rectangular panel defining at east one rectangular opening therethrough in close proximity to an upper edge of said panel, each of said at least one opening defining an upper attachment point for one of said at least one mid-panel means; and
at least one mid-panel toe receptor means mounted and extending into a surface of the panel of the aft panel means in close proximity to a lower edge of said panel and in direct vertical alignment with a corresponding one of said at least one rectangular opening for defining a lower attachment point for one of said at least one mid-panel means;

said platform means includes floor means for forming a top surface of the platform means which defines a trough along an aft edge thereof and corresponding to a position of said at least one mid-panel toe receptor means on the aft panel means; and each of said at least one mid-panel means includes:
a substantially rectangular panel;
a rear foot attached to an aft lower corner of the panel of the mid-panel means so that a portion of said foot extends beyond a bottom edge and an aft edge of said panel for mating with said trough in the floor means and the toe receptor means to support a bottom edge of the panel of the mid-panel means above the floor of the platform means; and L bracket means attached to an upper aft corner of the panel of the mid-panel means so that a portion of said bracket means extends beyond the aft edge and an upper edge of the panel of the mid-panel means for being received in, extending through, and above a top of, one of said at least one rectangular openings in the panel of the aft panel means to attach the aft panel means to the at least one mid-panel means.

22. A collapsible, reusable, livestock transport stable as in claim 18 wherein:

each of said at least one mid-panel means includes:
a substantially rectangular panel;
a front toe bracket attached to a forward lower corner of the panel of the at least one mid-panel means so that a portion of said toe bracket extends beyond a bottom edge, and is generally in-line with a forward edge, of said panel of the mid-panel means to support and lock in place the bottom edge of the panel of the mid-panel means above a floor of the platform means; and said platform means includes:
floor means for forming a top surface of the platform means which defines a trough along a forward edge thereof and corresponding to a position of said at least one mid-panel means; and
locking means in the trough along the forward edge of said platform means for capturing said front toe bracket of said at least one mid-panel means.

23. A collapsible, reusable, livestock transport stable as in claim 22 wherein said locking means includes:

a fixed position locking bar extending diagonally upward from the bottom to a center of said trough with an upper end just below the top surface said floor; and a moveable locking bar swivelly mounted near the top and a center of said trough so that when a free end of the moveable bar extends from said trough perpendicularly to said floor means said toe bracket on the panel of the mid-panel means can pass between the fixed bar and the movable bar and when the free end of the moveable bar is depressed into said trough the free end rests on a bottom of said trough with an other end of said moveable bar coming into contact with said toe bracket to push an other side of said toe bracket up against the upper end of said fixed bar in this the locked position a space between the upper and of said fixed bar and the upper end of said moveable bar is substantially the same as a width of said toe bracket.

24. A transportable stable comprising:

platform means for providing a base of the stable, said platform means including a first side, a second side, an aft side, a forward side, and a top generally planar surface;

a pair of generally planar side panel means for forming sides of the stable, a first of said pair of side panels means being rotatably connected to said platform means along a first axis of rotation generally parallel to and in close proximity to said first side of said platform means, a second of said pair of side panel means being rotatably connected along a second axis of rotation, generally parallel to and in close proximity to said second side of said platform means, wherein each of said pair of side panel means includes a forward edge and an aft edge, such that when the stable is assembled each of said pair of side panel means is oriented generally perpendicular to said top surface of said platform means;

aft panel means for forming an aft side of said stable, said aft panel means resting on said platform means along said aft side of said platform, said aft panel means including a pair of side edges such that when said stable is assembled a first of said side edges is operatively coupled to said aft edge of said first of said pair of side panel means by a lower connection means and an upper connection means, wherein said lower connection means includes a pair of cooperative features, a first cooperative feature on said aft panel means and a second cooperative feature on said first of said pair of side panel means, such that to operatively couple said first and said second side panel means to said aft panel means said first side panel means must be rotated about said first axis of rotation in a direction away from a perpendicular to said top surface of said platform means to a position outside an aft panel means installation path and said first cooperative feature on said aft panel means is disengaged from said second cooperative feature on said first of said pair of side panel means and such that rotation of said first of said pair of side panel means into said installation path will immediately engage said first and said second cooperative features and will thereby capture a lower portion of said aft panel means to hold said lower portion of said aft panel means in a generally fixed position, wherein when said first side panel means is rotated to an approximately perpendicular orientation to said top surface of said platform means, said upper connection means can be engaged to hold said aft panel means connected to said first side panel means and said platform means; and door means attached to a forward edge of each pair of side panel means for providing closure of the stable.

25. A transportable stable as in claim 24 wherein said platform means includes waste containment means for collecting and containing solid and liquid waste from livestock contained in the stable.

26. A transportable stable as in claim 24 wherein said platform means includes;

floor means for forming said top surface of said platform means; and a plurality of spaced-apart support means beneath said top surface of said floor means for supporting the platform means and for providing reservoirs for solid and liquid animal waste;

said floor means defining drain means therethrough in communication with said plurality of support means for draining animal waste from said floor means into said support means.

27. A transportable stable as in claim 24 wherein: said platform means includes:

rail means along said first and said second side extending vertically upward from an interior surface of said platform means;

a pair of rear pointing pintle means disposed along a top inboard edge of each of said rail means and spaced away from said forward and said aft sides of said platform for attachment to one of said side panel means; and each of said side panel means includes:

a flat, substantially rectangular panel; and a pair of pintle receptacle receiving means mounted into a first side of the panel means spaced upward from a bottom edge and away from the forward and aft edges of said panel means so that said pair of pintle receptacle means are adjacent said pintle means of the rail means when the stable is assembled so that said first side panel means is rotatable around a top edge of the rail means wherein one of said first or said second axis of rotation is within said pintle receptacle receiving means.

28. A transportable stable as in claim 27 wherein said receptacle receiving means includes:

an outer plate defining a rectangular, horizontally oriented slot therethrough;

a pintle receiving tube having interior dimensions and shape to receive the pintle means therewithin, said tube being attached to an inner surface of said outer plate and having a major axis of the tube aligned with a center-line of said slot, said tube having a length that is less than one-half the length of said slot.

29. A transportable stable as in claim 24, wherein said second cooperative feature on said first of said side panel means comprises a flat, substantially rectangular panel having a notch defined therein at a lower aft corner thereof;

wherein a said upper connection means on said side panel means comprises a receptacle defining a rectangular hole therethrough attached to an upper aft corner of said first of said side panel means; and wherein said first cooperative feature on said aft panel means includes:

a tab extending above a surface of said aft panel means at a lower side corner of said side panel means for mating with said notch of said second cooperative feature of said side panel means when said aft panel means is installed on said platform means and said side panel means are generally perpendicular to said top surface of said platform; and a pair of L-shaped brackets each attached to an upper side corner of, and extending outward beyond the two end edges of said aft panel means with a tang of said bracket extending rearward in a plane that is substantially perpendicular to a plane connecting the two aft edge of said side panel means, said tang being sized and shaped to pass through said rectangular hole in said receptacle attached to said side panel means and said tang being in contact with an outer surface of said receptacle when said aft panel means is installed on said platform means and the panel of said side panel means is generally perpendicular to said top surface of said platform means.

30. A transportable stable as in claim 29 wherein each of said receptacles of each side panel means and said tang of each of the L brackets attached to the aft panel means has defined therein a tie-down hole therethrough, the tie-down hole in the receptacle is aligned with the tie-down hole in the tang when said side and aft panel means are in their assembled positions on said platform means.

31. A transportable stable as in claim 24 wherein:

each of said pair of side panel means includes door hinge/locking hardware means along a front edge thereof for hingedly supporting and locking said door means; and said door means includes a flat, substantially rectangular panel having hinge pintle means attached to the top and bottom corners of one vertical edge thereof with lock clearance notches defined therein along that edge and adjacent said hinge pintle means, and top and bottom corners of another vertical edge of said door means defining hinge clearance notches therein with door locking hasps adjacent said hinge clearance notches, said hinge and lock clearance notches being provided to enable said door means to either lock with or be hinged from the hinge/locking hardware means on the front edge of either side panel means.

32. A transportable stable as in claim 31 wherein said door hinge/locking hardware means includes:

a body portion for attachment to said forward edge of said side panel means, said body portion defining a hinge pintle receptor cavity for receiving said hinge pintle of the door means from either end of said cavity; and turn lock means spaced apart from said hinge pintle receptor cavity and attached to said body portion for mating with said door locking hasp of said door means.

33. A transportable stable as in claim 24 wherein:

said stable further comprises at least one mid-panel means attachable to said platform means and said aft panel means for dividing the interior of the stable into stalls; and said stable further comprises at least one mid-panel means attachable to said platform means and said aft panel means for dividing the interior of the stable into stalls; and said door means includes one door for each stall to provide closure of the stable with each door being hingedly attached to and locking with either the side panel means or the mid-panel means.

34. A transportable stable as in claim 33 wherein:

each of said side panel means includes door hinge/locking hardware means along a front edge thereof for hingedly supporting and locking said door means;

each of said at least one mid-panel means includes door hinge/locking hardware means along a front edge thereof for hingedly supporting and locking said door means; and said door means includes a flat, substantially rectangular panel having hinge pintle means attached to the top and bottom corners of one vertical edge with lock clearance notches defined therein along that edge and adjacent said hinge pintle means, and top and bottom corners of another vertical edge defining hinge clearance notches with door locking hasps adjacent said hinge clearance notches, said hinge and lock clearance notches being provided to enable said door means to either lock with or be hinged from the hinge/locking hardware means on the front edge of either the side panel means or the mid-panel means.

35. A transportable stable as in claim 34 wherein said door hinge/locking hardware means includes:

a body portion for attachment to a front edge of said side or mid-panel means, said body portion defining a hinge pintle receptor cavity for receiving the hinge pintle of the door means from either end of said cavity; and turn lock means spaced apart from said hinge pintle receptor cavity and attached to said body for mating with said door locking hasp of said door means.

* * * * *